(12) United States Patent
Zerbola

(10) Patent No.: US 11,529,791 B2
(45) Date of Patent: Dec. 20, 2022

(54) BELT COMPRISING A FABRIC WITH BILATERAL SATIN WEAVE

(71) Applicant: Chiorino S.p.A., Biella (IT)

(72) Inventor: Marco Zerbola, Pralungo (IT)

(73) Assignee: Chiorino S.p.A., Biella (IT)

( * ) Notice: Subject to any disclaimer, the term of this patent is extended or adjusted under 35 U.S.C. 154(b) by 251 days.

(21) Appl. No.: 16/738,012

(22) Filed: Jan. 9, 2020

(65) Prior Publication Data
US 2020/0223176 A1  Jul. 16, 2020

(30) Foreign Application Priority Data

Jan. 11, 2019 (IT) .................. 102019000000496

(51) Int. Cl.
| | |
|---|---|
| D03D 15/283 | (2021.01) |
| B32B 5/24 | (2006.01) |
| B32B 5/02 | (2006.01) |
| B32B 5/18 | (2006.01) |
| B32B 27/12 | (2006.01) |
| B32B 27/30 | (2006.01) |
| B65G 15/34 | (2006.01) |

(Continued)

(52) U.S. Cl.
CPC .............. *B32B 5/245* (2013.01); *B32B 5/024* (2013.01); *B32B 5/18* (2013.01); *B32B 27/12* (2013.01); *B32B 27/304* (2013.01); *B65G 15/34* (2013.01); *D03D 1/0094* (2013.01); *D03D 15/283* (2021.01); *D03D 15/41* (2021.01); *B32B 2255/02* (2013.01); *B32B 2260/021* (2013.01); *B32B 2262/0284* (2013.01); *B32B 2266/0235* (2013.01); *B32B 2307/3065* (2013.01); *B32B 2413/00* (2013.01); *D10B 2331/04* (2013.01)

(58) Field of Classification Search
CPC .................................................. D03D 15/283
See application file for complete search history.

(56) References Cited

U.S. PATENT DOCUMENTS

| | | | | |
|---|---|---|---|---|
| 4,414,263 A | * | 11/1983 | Miller | .................... D21F 7/083 162/900 |
| 4,600,626 A | * | 7/1986 | Ogata | .................... B60R 22/12 139/384 R |

(Continued)

FOREIGN PATENT DOCUMENTS

| | | |
|---|---|---|
| CN | 1409784 A | 4/2003 |
| CN | 1585841 A | 2/2005 |

(Continued)

OTHER PUBLICATIONS

Chinese Office Action dated Jan. 22, 2021. 9 pages.
Italian Search Report dated Sep. 9, 2019. 8 pages.

*Primary Examiner* — Andrew T Piziali
(74) *Attorney, Agent, or Firm* — RMCK Law Group PLC

(57) ABSTRACT

A belt includes at least one fabric having a first face and a second face parallel to a longitudinal plane of the belt, wherein the fabric includes: a first weft layer formed by a plurality of multifilament weft yarns essentially parallel to each other; a second weft layer formed by a plurality of monofilament weft yarns essentially parallel to each other, wherein the multifilament weft yarns of the first weft layer are overlapped with respective monofilament weft yarns of the second weft layer; and a plurality of multifilament warp yarns wherein the fabric has a weft dominance satin weave on both sides.

4 Claims, 3 Drawing Sheets

(51) Int. Cl.
*D03D 1/00* (2006.01)
*D03D 15/41* (2021.01)

(56) References Cited

U.S. PATENT DOCUMENTS

| | | | |
|---|---|---|---|
| 6,328,077 B1 | 12/2001 | Mol | |
| 2003/0068948 A1* | 4/2003 | Smith | D21F 1/0027 442/205 |
| 2008/0164127 A1* | 7/2008 | Hawkins | B65G 15/32 198/844.1 |
| 2012/0125473 A1 | 5/2012 | Billups | |
| 2019/0070539 A1* | 3/2019 | Baron | D03D 1/0094 |

FOREIGN PATENT DOCUMENTS

| | | | |
|---|---|---|---|
| CN | 105692049 A | 6/2016 |
| CN | 207941297 U | 10/2018 |
| JP | H075176 B2 | 1/1995 |

\* cited by examiner

BELT COMPRISING A FABRIC WITH BILATERAL SATIN WEAVE

CROSS-REFERENCE TO RELATED APPLICATIONS

This application claims priority to Italian Patent Application No. 102019000000496 filed Jan. 11, 2019. The disclosure of the above application is incorporated herein by reference in its entirety.

FIELD OF THE INVENTION

The present invention relates to a belt comprising at least one fabric.

In the following description and in the claims, the term "belt" is intended to indicate a flexible element for transmitting movement or for transporting objects, such as for example transmission belts, conveyor belts, process belts, etc.

DESCRIPTION OF THE PRIOR ART

A belt, for example, a conveyor belt for moving objects, such as packages and the like, typically comprises at least one fabric and one or more layers of elastomeric or thermoplastic material. The fabrics used for constructing belts are formed of yarns that can be made of synthetic material, for example, polyester, aramid, polyamide, polyolefin, etc. or natural materials such as cotton, linen, hemp, etc. The yarns may also be made of fibers of mineral materials, such as glass or carbon. The fabric can be formed by multifilament or monofilament yarns.

In the sector of conveyor belts used in the logistics or transport of materials sector, the belts must have the following requirements:
flame retardant,
low cost,
low energy consumption during operation,
low noise (in some applications).

A standard conveyor belt may have a transport side equipped with a PVC covering layer, a PET-fabric on the transport side, an intermediate PVC layer, a PET-fabric on the sliding side, and an impregnation layer on the sliding side.

Generally, the characteristics of low energy consumption and the low noise characteristics of a belt are mutually antithetical. Typically, a belt that is optimized to have low energy consumption is usually not optimal from the point of view of low noise and—conversely—a belt optimized for low noise is generally not optimal from the point of view of low energy consumption.

The weave and the characteristics of the fabric yarns are selected according to the characteristics to be optimized (low energy consumption or low noise).

OBJECT AND SUMMARY OF THE INVENTION

The object of the present invention is to provide a belt that offers greater versatility in view of optimizing the characteristics of low energy consumption or low noise.

According to the present invention, this object is achieved by a belt having the characteristics forming the subject of claim 1.

Preferred embodiments of the invention form the subject of the dependent claims.

The claims form an integral part of the disclosure provided here in relation to the invention.

BRIEF DESCRIPTION OF THE DRAWINGS

The present invention will now be described in detail with reference to the attached drawings, given purely by way of non-limiting example, wherein.

DETAILED DESCRIPTION

Figure 1:
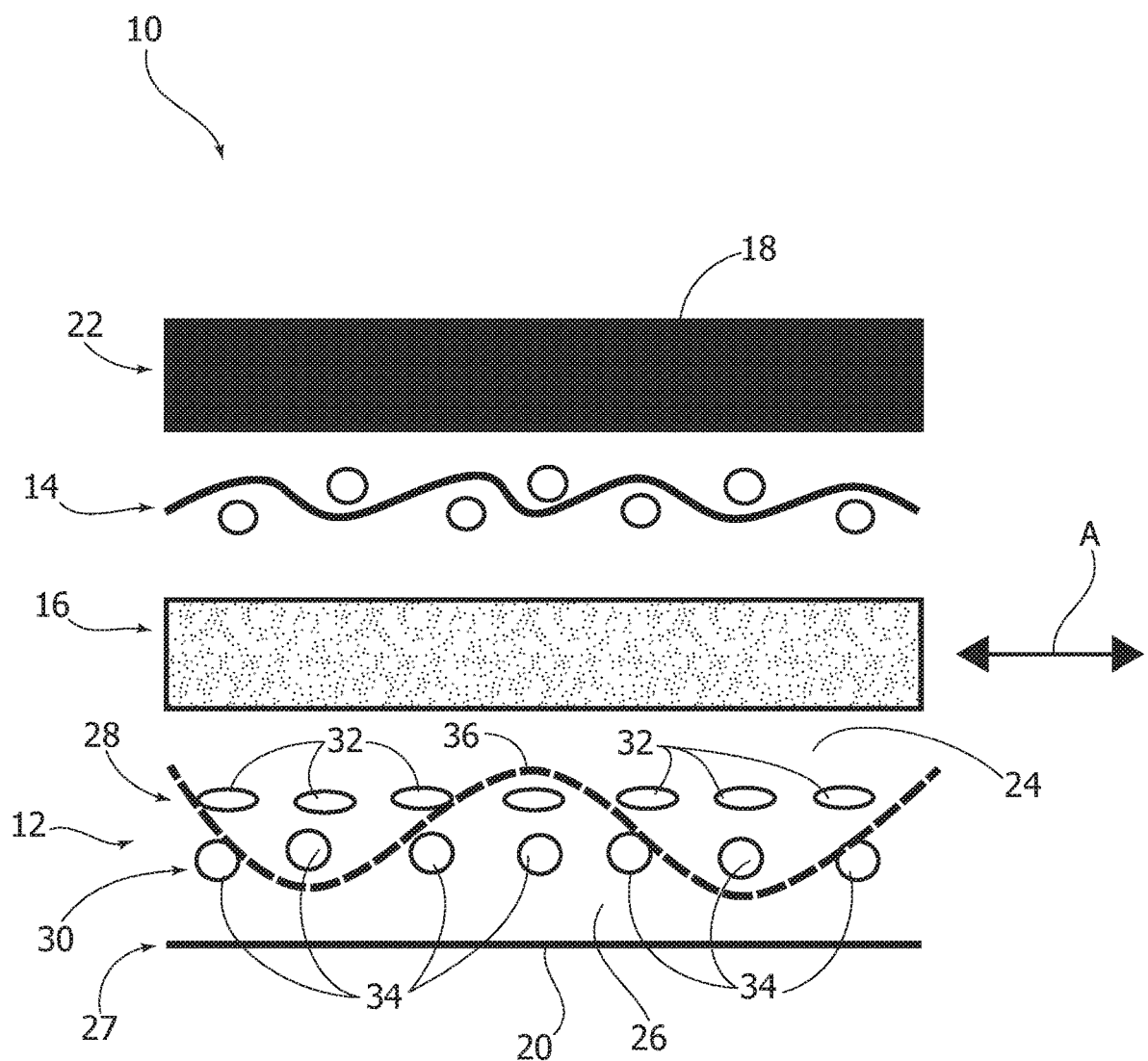
FIG. 1 is a schematic view of a belt according to an embodiment of the present invention.

With reference to FIG. 1, the number 10 schematically indicates a belt that can be used, for example, as a conveyor belt for transporting materials. The belt 10 comprises a first fabric 12 and a second fabric 14 between which an intermediate layer 16 of thermoplastic material, for example, of foamed PVC, is arranged. The belt 10 has a transport surface 18 on which the materials to be carried rest, and a sliding surface 20 that cooperates with the support and drive members of the belt 10. The transport surface 18 is formed by a covering layer of thermoplastic material 22, for example, of flame retardant PVC. The second fabric 14 is arranged between the transport side covering layer 22 and the intermediate layer 16.

The first fabric 12 has a first face 24 and a second face 26 parallel to a longitudinal plane A of the belt 10. The first face 24 of the fabric 12 is in contact with the intermediate layer 16. An impregnation layer 27 is applied on the second face 26 of the fabric 12, made of material with a low coefficient of friction forming the sliding surface 20.

The fabric comprises a first weft layer 28 forming the first face 24 and a second weft layer forming the second face 26. The first weft layer 28 is formed by a plurality of multifilament weft yarns 32 essentially parallel to each other. The second weft layer 30 is formed by a plurality of monofilament weft yarns 32 essentially parallel to each other. The weft yarns 32 of the first weft layer 28 are overlapped on respective weft yarns 34 of the second weft layer 30.

The multifilament weft yarns 32 can be formed of polyester filaments produced by extrusion. The multifilament weft yarns 32 can be high tenacity (HT) multifilament PET yarns with 92 filaments. In one embodiment, the multifilament yarn count 32 can be between 105 and 115 TEX (measured according to the UNI 9275 regulation: 1988 method A). For example, the multifilament yarn count 32 can be 110 TEX.

The multifilament yarn 32 can be a parallel yarn without twists. The weft layer 28 formed by parallel multifilament yarns is advantageous because it helps to create a barrier effect to the passage of PVC.

The monofilament weft yarns 34 of the second weft layer 30 can be polyester yarns produced by extrusion with a predetermined diameter. In one embodiment, the diameter of the monofilament yarns 34 can be between 0.28 and 0.32 mm, for example, 0.3 mm.

The weft yarns 32, 34 can be arranged with a density between 26 and 28 yarns/cm, for example, 27 yarns/cm.

The fabric 12 comprises a plurality of warp yarns 36 intertwined with the weft yarns 32, 34.

The multifilament warp yarns 36 can be formed of polyester filaments produced by extrusion.

The multifilament warp yarns 36 can be high tenacity (HT) multifilament PET yarns with 92 filaments.

In one embodiment, the warp yarn count 36 can be between 105 and 115 TEX (measured according to the UNI 9275 regulation: 1988 method A). For example, the multifilament yarn count 36 can be 110 TEX.

The multifilament yarn 36 is twisted, with a torsion number between 100 and 110 rounds/m, and never below 100 rounds/m (measured according to the UNI EN ISO 2061: 2010 regulation). For example, the number of twists can be 100 rounds/m.

The fabric 12 has a satin weave on both faces 24, 26 (bilateral satin weave). The satin weave of the fabric 12 has a weft dominance on both faces 24, 26.

Figure 2:
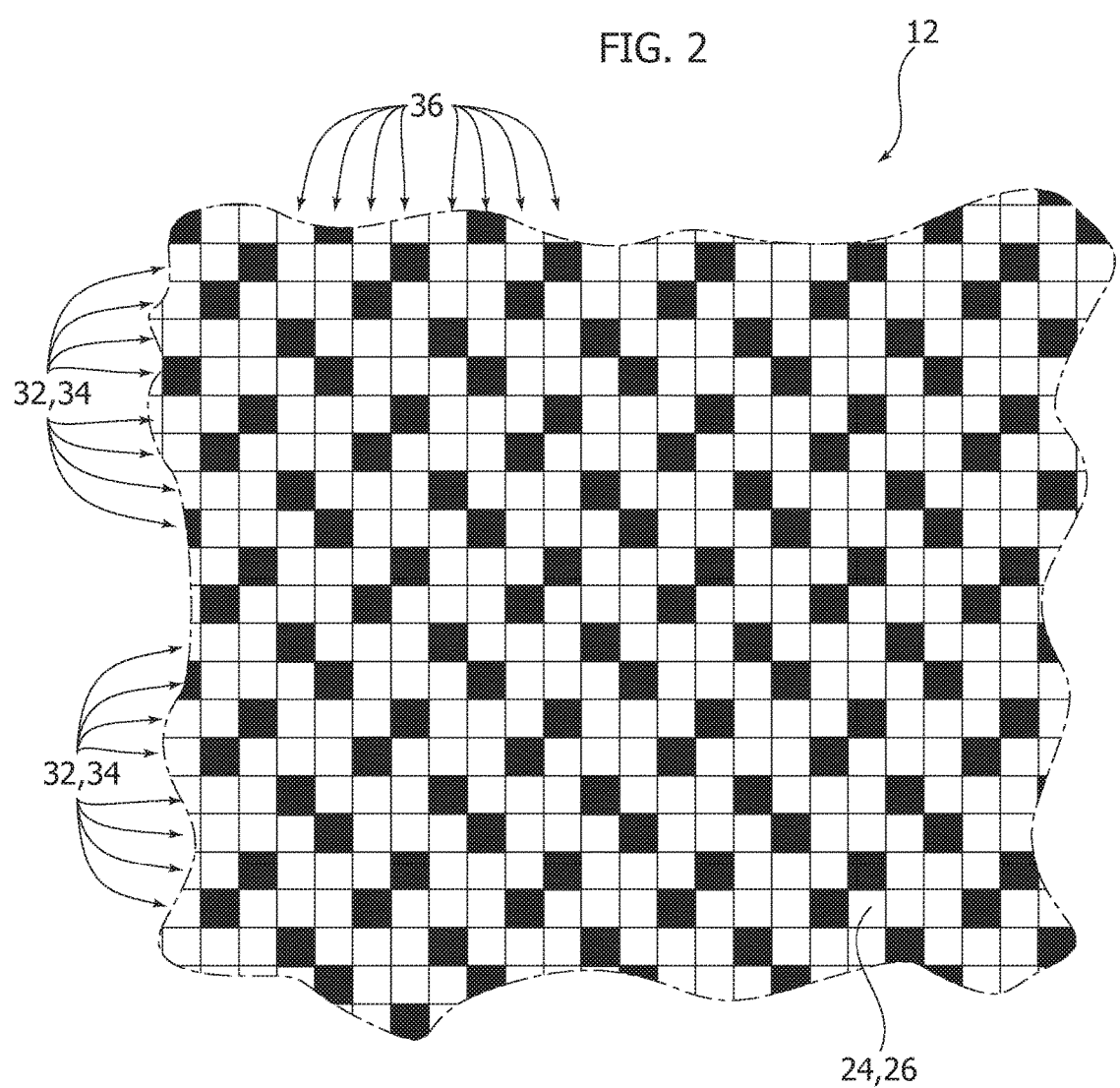
FIG. 2 is a diagram illustrating the weave of each of the two faces of the fabric indicated by the arrow II in FIG. 1.

FIG. 2 illustrates a possible embodiment of the weave of the fabric 12. The weave of the fabric 12 is the same on both faces 24, 26. On both faces 24, 26 the weave of the fabric is a satin weave with weft dominance (light satin). In the example illustrated the weave is a satin of four.

In the representation of FIG. 2, the rows represent the weft yarns 32, 34 and the columns represent the warp yarns 36. A black square indicates that the warp yarn 36 is above the weft yarn 32, 34 of the weft layer 28, 30 of the face 24, 26 that is observed. A white square indicates that the warp yarn 26 is below the weft yarn 32, 34 of the weft layer 28, 30 of the face 24, 26 that is observed.

Both faces 24, 26 have the same weave but differ from each other in that the face 24 has a dominance of multifilament weft yarns 32 while the face 26 has a dominance of monofilament weft yarns 34.

Figure 3:
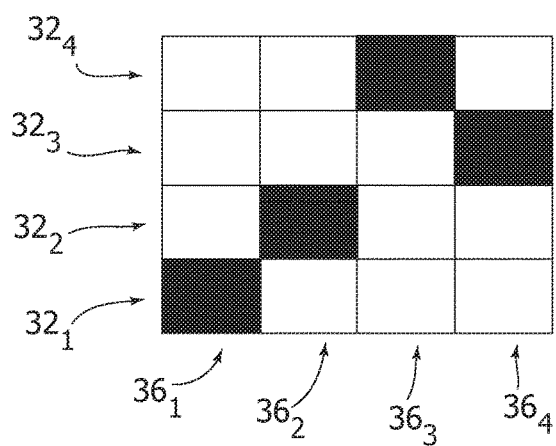
FIG. 3 is a diagram illustrating an elementary weave unit of the fabric of FIG. 2.
Figure 4:
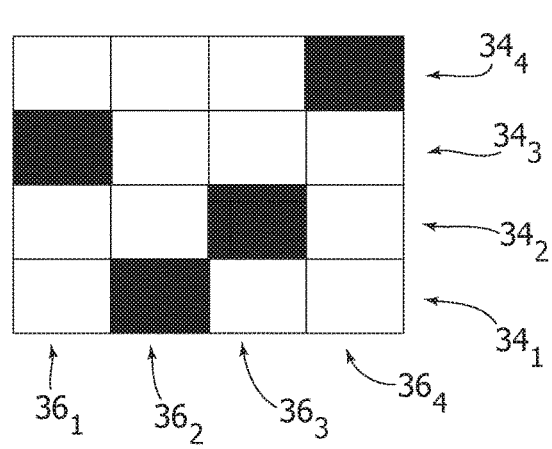
FIG. 4 shows an elementary weave unit opposite to the elementary weave unit of FIG. 3, and FIGS. 5, 6, 7 and 8 are schematic views illustrating the arrangement of the warp yarns in the elementary reinforcement units of FIGS. 3 and 4.
Figure 5:
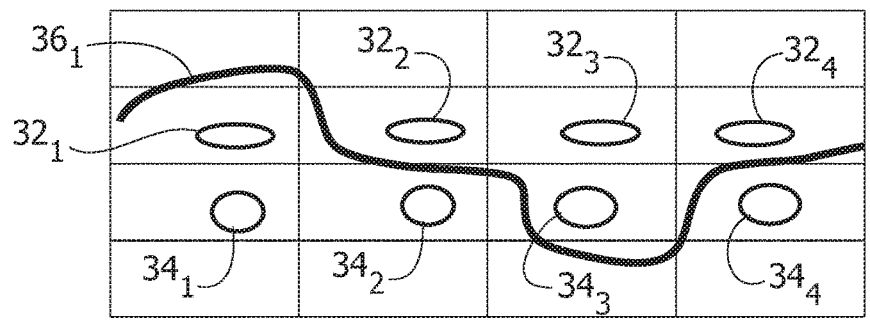
Figure 6:
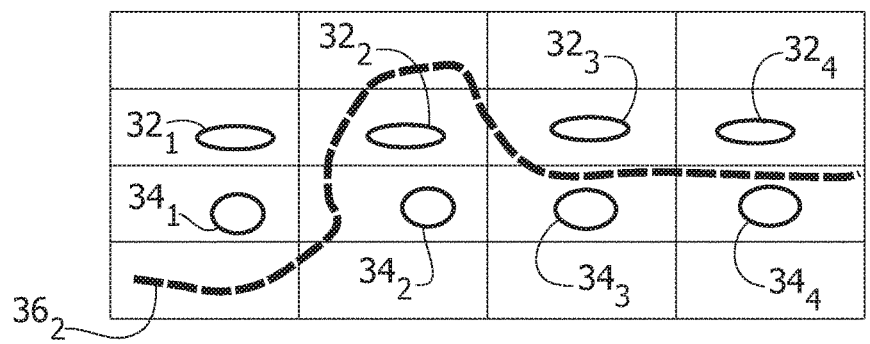
Figure 7:
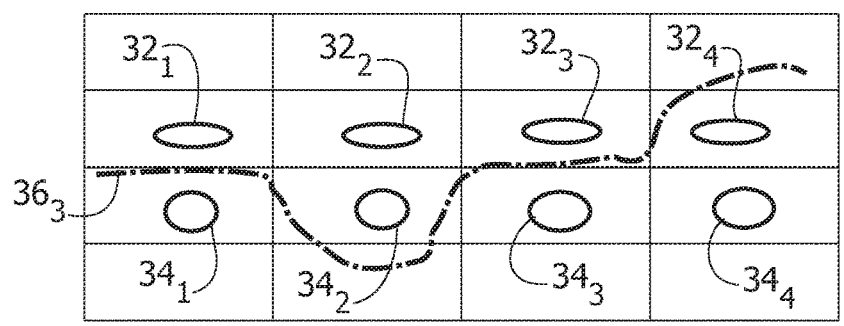
Figure 8:
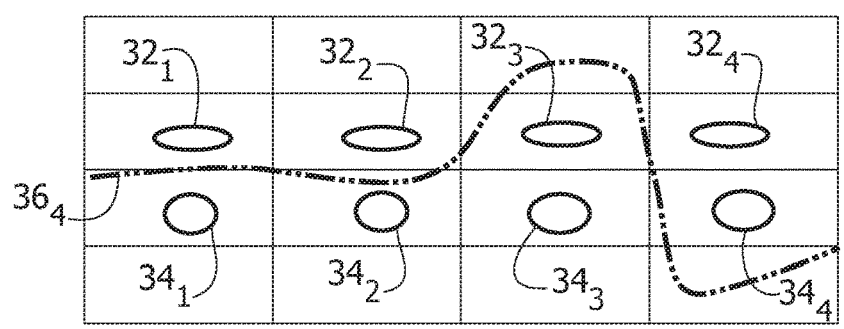

The weave illustrated in FIG. 2 is obtained by reproducing one elementary weave unit an indeterminate number of times, the weave unit having the pattern illustrated in FIG. 3, formed by four weft yarns and four warp yarns. FIG. 4 illustrates the corresponding elementary weave unit opposite to the elementary weave unit of FIG. 3. In other words, FIGS. 3 and 4 illustrate the same part of fabric 12 observed on opposite sides.

With reference to FIGS. 3-8, each elementary weave unit of the fabric 12 comprises four multifilament weft yarns of the first weft layer 28 indicated with $32_1$, $32_2$, $32_3$, $32_4$, four monofilament weft yarns of the second weft layer 28, indicated with $34_1$, $34_2$, $34_3$, $34_4$ and four multifilament warp yarns 36 indicated with $36_1$, $36_2$, $36_3$, $36_4$.

In each elementary weave unit including four weft yarns and four warp yarns, each warp yarn $36_1$, $36_2$, $36_3$, $36_4$ is intertwined with just one weft yarn $32_1$, $32_2$, $32_3$, $32_4$ of the first weft layer 28 and with just one weft yarn $34_1$, $34_2$, $34_3$, $34_4$ of the second weft layer 30.

On each face 24, 26 of the fabric 12 the intertwining points of the warp yarns are never aligned with each other in the longitudinal direction of the weft yarns or in the direction transverse to the weft yarns.

The different morphology of the two faces 24, 26 of the fabric 12 allows different properties of the belt to be obtained according to how the fabric 12 is oriented in the structure of the belt 10.

If the fabric 12 is arranged as shown in FIG. 1, with the first weft layer 28 formed by multifilament yarns 32 facing the intermediate layer 16, and the second weft layer 30 formed by monofilament yarns 34 facing the sliding side, a belt 10 is obtained in which the reduction of the friction coefficient is optimized.

If the same fabric 12 is arranged in the structure of the belt 10 in the opposite way, that is with the second weft layer 30 facing the intermediate layer 16 and the first weft layer 28 facing the sliding side, a belt 10 is obtained in which low noise is optimized, and partly a decrease in the friction coefficient.

The fabric 12 therefore allows two types of belt 10 to be produced with different characteristics using a single fabric. In particular, a belt 10 can be obtained in which the reduction of the friction coefficient is optimized or a belt 10 in which the noise reduction is optimized.

In both embodiments, the fabric 12 allows the adhesion with the intermediate layer 16 to be increased since both the faces 24, 26 of the fabric, having a predominance of weft yarns, favor a better adhesion to the intermediate layer 16, in particular in the case in which the intermediate layer is made of PVC, which adheres well on fabrics with a weft predominance.

The fabric 12, furthermore, allows reduction of the passage of PVC from the intermediate layer 16 towards the sliding face thanks to the barrier formed by the weft layer of the face of the fabric 12 adhering to the intermediate layer 16. Reducing the passage of PVC through the fabric reduces the friction coefficient in both modes in which the fabric can be oriented.

Moreover, the fabric 12 has a high transverse rigidity thanks to the weft layer 30 formed by monofilament yarns with a large diameter (for example 0.3 mm).

Of course, without prejudice to the principle of the invention, the details of construction and the embodiments can be widely varied with respect to those described and illustrated, without thereby departing from the scope of the invention as defined by the claims that follow.

The invention claimed is:

1. A belt comprising:
   a first fabric,
   a second fabric,
   an intermediate layer of thermoplastic material arranged between the first fabric and the second fabric,
   a transport surface formed on the second fabric by a covering layer of thermoplastic material,
   wherein the first fabric has a first face and a second face parallel to a longitudinal plane of the belt,
   wherein the first face of the first fabric is in contact with the intermediate layer, and an impregnation layer is applied on the second face of the first fabric,
   wherein the first fabric comprises a first weft layer formed by a plurality of multifilament weft yarns and a second weft layer formed by a plurality of monofilament weft yarns,
   wherein the multifilament weft yarns of the first weft layer are overlapped on respective monofilament weft yarns of the second weft layer,
   wherein the first fabric has a satin weave on the first and second faces, the satin weave having a weft dominance on the first and second faces,
   wherein in an elementary weave unit of the first fabric including four weft yarns and four warp yarns, i) each warp yarn is intertwined with just one multifilament weft yarn of the first weft layer and with just one monofilament weft yarn of the second weft layer, and ii) on each face of the first fabric, intertwining points of the warp yarns are not aligned with each other in a longitudinal direction of the multifilament and monofilament weft yarns or in a direction perpendicular to the multifilament and monofilament weft yarns.

2. The belt according to claim 1, wherein said impregnation layer forms a sliding surface.

3. The belt according to claim 2, wherein the first weft layer of the first fabric is adherent to said intermediate layer and the second weft layer is coated with said impregnation layer.

4. The belt according to claim 2, wherein the second weft layer of the first fabric is adherent to said intermediate layer and the first weft layer is covered with said impregnation layer.

* * * * *